United States Patent
Sun et al.

(10) Patent No.: US 10,782,587 B2
(45) Date of Patent: Sep. 22, 2020

(54) DISPLAY PANEL, METHOD FOR MANUFACTURING THE SAME, AND DISPLAY DEVICE

(71) Applicants: BOE Technology Group Co., Ltd., Beijing (CN); Beijing BOE Display Technology Co., Ltd., Beijing (CN)

(72) Inventors: Shumeng Sun, Beijing (CN); Xiaohu Li, Beijing (CN); Minghui Zhang, Beijing (CN); Inho Park, Beijing (CN); Weitao Chen, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 13 days.

(21) Appl. No.: 15/920,112

(22) Filed: Mar. 13, 2018

(65) Prior Publication Data
US 2019/0049817 A1    Feb. 14, 2019

(30) Foreign Application Priority Data
Aug. 14, 2017 (CN) .......................... 2017 1 0693897

(51) Int. Cl.
*G02F 1/23* (2006.01)

(52) U.S. Cl.
CPC ............ *G02F 1/23* (2013.01); *G02F 2203/48* (2013.01); *G02F 2203/58* (2013.01)

(58) Field of Classification Search
CPC .... G02F 1/23; G02F 2203/48; G02F 2203/58; G02F 1/167; G02F 1/1333
USPC .......................... 359/228, 237, 238, 240, 245
See application file for complete search history.

(56) References Cited

U.S. PATENT DOCUMENTS

| | | | |
|---|---|---|---|
| 2010/0060974 A1* | 3/2010 | Wang | G02B 26/004 359/296 |
| 2015/0370141 A1 | 12/2015 | Gou | |
| 2018/0213198 A1 | 7/2018 | Li et al. | |
| 2019/0271886 A1* | 9/2019 | Lim | C09K 19/20 |

FOREIGN PATENT DOCUMENTS

| | | |
|---|---|---|
| CN | 104090361 A | 10/2014 |
| CN | 105187809 A | 12/2015 |
| CN | 106024837 A | 10/2016 |
| CN | 106504713 A | 3/2017 |
| JP | 2008070400 A | 3/2008 |

OTHER PUBLICATIONS

Office Action for corresponding Chinese Application 201710693897.4 dated Dec. 20. 2019.

* cited by examiner

*Primary Examiner* — Tuyen Tra
(74) *Attorney, Agent, or Firm* — Arent Fox LLP; Michael Fainberg

(57) ABSTRACT

Disclosed are a display panel, a method for manufacturing the same, and a display device. An embodiment of the disclosure provides a display panel including: a display module, and a filter layer located on a light exit side of the display module, wherein the filter layer is configured to be switched between at least two display modes so that it does not filter out light emitted from the display module in one of the display mode, and filters out light emitted from the display module in a preset range of wavelengths in the other display mode.

18 Claims, 3 Drawing Sheets

DISPLAY PANEL, METHOD FOR MANUFACTURING THE SAME, AND DISPLAY DEVICE

CROSS-REFERENCE TO RELATED APPLICATION

This application claims priority of Chinese Patent Application No. 201710693897.4, filed on Aug. 14, 2017, which is hereby incorporated by reference in its entirety.

FIELD

The present disclosure relates to the field of display technologies, and particularly to a display panel, a method for manufacturing the same, and a display device.

BACKGROUND

Those vision-disabled (colorblind) users generally have to wear glasses for their vision disabling, or to purchase such a small number of display devices dedicated to the vision-disabled watchers in the market at present to thereby enjoy visual and audible pleasure from the advancing display technologies. In order to accommodate both a normal display device for a vision-healthy watcher, and a display device for a vision-disabled watcher in a family of respective members including both a vision-disabled patient and a vision-healthy member, an assisting device or a dedicated display device has to be purchased in addition at present.

SUMMARY

An embodiment of the disclosure provides a display panel including: a display module, and a filter layer located on a light exit side of the display module, wherein the filter layer comprises a transparent medium; wherein the transparent medium is doped with band stop filter particles configured to filter out a light emitted from the display module in a preset range of wavelengths.

Optionally the filter layer comprises a first electrode, a second electrode, and the transparent medium is located between the first electrode and the second electrode; the filter layer is configured to be switched between at least two display modes under an action of an electric field and/or a magnetic field, so that it does not filter out light emitted from the display module in one of the display modes, and filters out light emitted from the display module in the preset range of wavelengths in other one of the display modes.

Optionally the transparent medium is transparent polar liquid.

Optionally the second electrode is arranged on the display module, and the filter layer further includes a transparent hydrophobic layer arranged on the side of the second electrode facing the first electrode, and the transparent medium is located between the hydrophobic layer and the first electrode.

Optionally the display panel further includes d a black matrix arranged on the hydrophobic layer.

Optionally an orthographic projection of the black matrix onto the display module lies within, or overlaps with, an orthographic projection of a black matrix, in the display module, for defining pixel elements.

Optionally the first electrode is carried above the black matrix on the hydrophobic layer.

Optionally the material of the band stop filter particles includes dichromate glutin.

Optionally the transparent medium is gas; the band stop filter particles are charged or magnetic.

An embodiment of the disclosure provides a display device including the display panel according to any one of the embodiments above of the disclosure.

Optionally the filter layer comprises a first electrode, a second electrode, and the transparent medium is located between the first electrode and the second electrode; the transparent medium is transparent polar liquid; and the display device further includes a control unit configured to control an electric field between the first electrode and the second electrode to be enabled and disabled, to thereby control the transparent polar liquid so that the band stop filter particles doped therein are in a converged and collected state, and a spread and tiled state.

An embodiment of the disclosure provides a method for manufacturing a display panel, the method includes: forming a display module; forming a filter layer on a light exit side of the display module; wherein the filter layer comprises a transparent medium; the transparent medium is doped with band stop filter particles configured to filter out a light emitted from the display module in a preset range of wavelengths.

DETAILED DESCRIPTION OF THE EMBODIMENTS

Some embodiments of the disclosure provide a display panel, a method for manufacturing the same, and a display device so as to satisfy a special display demand of a colorblind user.

For example, a display panel according to an embodiment of the disclosure includes a display module, and a filter layer located on a light exit side of the display module, wherein the filter layer includes a transparent medium. The transparent medium is doped with band stop filter particles configured to filter out a light emitted from the display module in a preset range of wavelengths, so as to satisfy a special display demand of a colorblind user.

Some embodiments of the disclosure provide a display panel, a method for manufacturing the same, and a display device so as to satisfy both a normal display demand of a normal user, and a special display demand of a colorblind user on the same display.

Figure 1:
FIG. 1 is a general schematic structural diagram of a display panel according to an embodiment of the disclosure.

Referring to FIG. 1, a display panel according to an embodiment of the disclosure includes a display module 101, and a filter layer 102 located on a light exit side of the display module, where the filter layer is configured to be switched between at least two display modes so that it does not filter out light emitted from the display module in one of the display mode, and filters out light emitted from the display module in a preset range of wavelengths in the other display mode.

Here the preset range of wavelengths can be preset as needed in reality, and the embodiment of the disclosure will not be limited to any particular range of wavelengths as long as a demand for a special watching user can be satisfied.

Optionally the preset range of wavelengths can be a range of wavelengths of light in a color corresponding to color recognition disabling of a vision-disabled user.

The display panel according to the embodiment of the disclosure includes the display module, and the filter layer located on the light exit side of the display module, where the filter layer is configured to be switched between the at least two display modes so that it does not filter out the light emitted from the display module in one of the display mode, and filters out the light emitted from the display module in the preset range of wavelengths in the other display mode, so that the display panel can be switched between different display modes, and for example, it can display in a normal display mode (in which the light emitted from the display module is not filtered out) to thereby satisfy a demand of a normal user, but also can display in a special mode (in which the light emitted from the display module in the preset range of wavelengths is filtered out) to thereby satisfy a demand of a colorblind user.

For example, there are two display modes of the filter layer in the embodiment of the disclosure, where the light emitted from the display module is filtered out in the first display mode applicable to a vision-disabled user; and the light emitted from the display module is not filtered out in the second display mode applicable to a vision-normal user, where the light emitted from the display module includes the light in the preset range of wavelengths to be filtered out, and the filter layer can be switched in use between the display modes as needed for the user.

The technical solution according to the embodiment of the disclosure can provide the same product with both the normal display mode, and the display mode for a vision-disabled user, where the product can be simple in structure, but also produced in a simple process, and the display mode can be switched at a high response speed, so the product will be cheap and more economic for both a vision-disabled user patient, and a vision-healthy user.

In the description above, the terms "colorblind" and "vision-disabled" as used refer to such a physiological vision phenomenon of color recognition disabling as defined medically that represents a defect of being unable to visually sensing a part or all of the differences between respective colors correctly. There may be three such defects: a vision defect of three primary colors (generally referred to as color weakness), a vision defect of two primary colors (generally referred to as color blindness), and a vision defect of a single primary color (generally referred to as complete color blindness). Respective display modes can be defined for particular different defects of color blindness, e.g., different types and extents of color blindness (e.g., protanopia, deuteranopsia, acyanoblepsia, daltonian, tritanopia, etc.).

In an embodiment of the disclosure, the filter layer is configured to be switched between the at least two display modes under the action of an electric field and/or a magnetic field.

For example, in an optional structural implementation, a component of the filter layer, which can filter out the light emitted from the display module in the preset range of wavelengths, can be driven by the electric field and/or the magnetic field to be collected and scattered (e.g., polymerized and tiled under an electro-polar or magnetic influence), or a crystal modality of molecules thereof can be driven by the electric field and/or the magnetic field to be transformed between a crystal modality with a filter effect, and a crystal modality with a non-filter effect, or a collection state of molecules thereof can be driven by the electric field and/or the magnetic field to be converted between a state with a filter effect, and a state with a non-filter effect (for example, monomers can be polymerized into a macromolecule polymer, and a macromolecule polymer can be depolymerized into monomers).

In an embodiment of the disclosure, the filter layer includes a first electrode, a second electrode, and a transparent medium located between the first electrode and the second electrode, where the transparent medium is doped with band stop filter particles configured to filter out the light emitted from the display module in the preset range of wavelengths.

Optionally the preset range of wavelengths is a range of wavelengths of light in a color corresponding to color recognition disabling of a vision-disabled user, and the band stop filter particles include a material capable of filtering out the corresponding range of wavelengths.

In an embodiment of the disclosure, the transparent medium is transparent polar liquid. A physical characteristic, e.g., a surface tension, a bonding force with the band stop filter particles therein, etc., of the transparent polar liquid can be changed when an electric field is applied thereto or disabled, to thereby drive the band stop filter particles to have their physical scattered state changed, for example, between a tiled state and a collected state so as to change the display mode. Optionally the transparent medium can alternatively be a non-liquid medium, e.g., the gas, and in this case, the band stop filter particles are charged or magnetic, so that they can be driven by the electric field or the magnetic field to be scattered or collected in the non-liquid transparent medium. Since the display effect may be affected by the magnetic particles, the band stop filter particles can be charged so that they are driven by the electric field to be scattered or collected in the non-liquid transparent medium.

In an embodiment of the disclosure, the second electrode is arranged on the display module, and the filter layer further includes a transparent hydrophobic layer arranged on the side of the second electrode facing the first electrode, and the transparent medium is located between the hydrophobic layer and the first electrode, where the transparent hydrophobic layer can be a water-repellent glass layer, a hydrophobic resin layer, a hydrophobic PTFE layer, an alkyl chain-containing organic acid molecule (fatty acid R—$(CH2)_n$COOH, where R is methyl, vinyl, acetylene, or another modifier group, for example) coating, for example, as long as the band stop filter particles can be scattered or collected.

In an embodiment of the disclosure, the surface of the second electrode is processed (e.g., immersed, spin-coated, deposited, machined, sprayed with a hydrophobic substance layer, etc.) to be hydrophobic, so that no separate hydrophobic layer will be arranged on the surface of the second electrode.

In the description above, the term "transparent" as used refers to a satisfactory transmittivity of light rays, e.g., no less than 60%, 80%, etc. In an embodiment of the disclosure, the transmittivity of light rays in the transparent hydrophobic layer is no less than 80%.

In an embodiment of the disclosure in which no hydrophobic layer is applied, the electric field between the first electrode and the second electrode acts on the surface tension on the polar liquid to thereby drive the band stop filter particles to have their physical scattered states between the collected and scattered states; and in an embodiment of the disclosure in which a hydrophobic layer is applied, the hydrophobic layer is so hydrophobic that the physical modality of the transparent polar liquid is changed in such a way that they can be in the collected state. In other words, the transparent polar liquid represents the collected state under the action of the hydrophobic layer of hydrophobic, i.e., a liquid drop state, when voltage is not applied, and the tiled state, i.e., a film state, when voltage is applied. The physical modality of the transparent polar liquid is changed to thereby bring the band stop filter particles therein into being scattered or collected, so as to change the physical scattered state of the band stop filter particles between the collected and scattered states more effectively and rapidly, thus changing the display mode. Furthermore the hydrophobic layer can further isolate the transparent polar liquid from the second electrode to thereby prevent the polar liquid from being affected by the second electrode.

In an embodiment of the disclosure, the transparent medium is transparent polar liquid, a transparent hydrophobic layer is arranged on the side of the second electrode facing the first node, and a black matrix is arranged on the hydrophobic layer.

In an embodiment of the disclosure, the transparent medium is a non-liquid medium, e.g., the gas, and a black matrix is arranged on the side of the second electrode facing the first electrode.

Optionally an orthographic projection of the black matrix onto the display module lies within, or overlaps with, an orthographic projection of a black matrix, in the display module, for defining pixel elements. Stated otherwise, there is also a black matrix arranged in the filter layer to divide the transparent medium in the filter layer between areas on light exit sides of different pixel elements, that is, the black matrix arranged in the filter layer divides the transparent medium into a plurality of segments so that the physical scattered state of the band stop filter particles in each segment of the transparent medium can be changed between the scattered and collected states; and the relationship between orthographic projections can be arranged as described above to thereby avoid an influence upon normal displaying.

Optionally the first electrode is carried above the black matrix on the hydrophobic layer. In this structure, the black matrix can further support the black matrix. Furthermore the first electrode is carried above the black matrix on the hydrophobic layer to thereby create some space between the transparent polar liquid and the first electrode so that there is a variable transparent polarity of the band stop filter particles in the physical scattered state changed between the scattered and collected states.

In an embodiment of the disclosure, the material of the band stop filter particles includes dichromate glutin.

In an embodiment of the disclosure, the transparent polar liquid can be water, ethanol, sodium chloride hydrated solution, potassium chloride hydrated solution, for example.

An embodiment of the disclosure provides a display device including the display panel according to any one of the embodiments above.

The display panel as referred to can be a traditional Liquid Crystal Display (LCD) panel, or can be an electroluminescent display panel (e.g., an Organic Light-Emitting Diode (OLED) display panel, a Quantum Dot Light Emitting Diode (QLED) display panel, etc.), and the arrangement of the filter layer can be adapted to a different type of display pane. For example, an array layer consisted of a transparent medium layer doped with band stop filter particles can be added above a Color Filter (CF) substrate of a TFT-LCD, or an array layer consisted of a transparent medium layer doped with band stop filter particles can be added above a package cover of the electroluminescent display panel.

In an embodiment of the disclosure, the display device further includes a control unit configured to control the filter layer to be switched between at least two display modes.

Here the control unit can be embodied as a logic operational processing circuit, e.g., a Central Processing Unit (CPU), an Application Specific Integrated Circuit (ASIC), a Digital Signal Processor (DSP), a Field Programmable Gate Array (FPGA), etc. The control unit can further include a memory, e.g., a Read Only Memory (ROM), a Random Access Memory (RAM), e.g., a Flash memory, storing program instructions and data, and the logic operational processing circuit reads and loads the program instructions and the data from the memory, so that the logic operational processing circuit performs functions of the control unit.

Optionally the control unit can be arranged on the display panel, e.g., in a circuit board of the display panel, or can be arranged outside the display panel, e.g., in a housing of the display device.

In an embodiment of the disclosure, the filter layer includes a first electrode and a second electrode, and a transparent medium located between the first electrode and the second electrode, where the transparent medium is doped with band stop filter particles configured to filter out the light emitted from the display module in the preset range of wavelengths; and the control unit is configured to control an electric field between the first electrode and the second electrode to be enabled and disabled, to thereby control a physical scattered state of the band stop filter particles.

Optionally the transparent medium is transparent polar liquid; and the control unit is configured to control the electric field between the first electrode and the second electrode to be enabled and disabled, to thereby control the transparent polar liquid so that the band stop filter particles doped therein are in a converged and collected state, and a spread and tiled state.

Optionally the transparent medium is a non-liquid medium, e.g., the gas, and the band stop filter particles are charged or magnetic, so that they can be driven by an electric field or a magnetic field to be scattered or collected in the non-liquid transparent medium.

Optionally the filter layer further includes a transparent hydrophobic layer arranged on the side of the second electrode facing the first electrode, and the transparent medium is located between the hydrophobic layer and the first electrode.

In the display device including a normal display mode, and a display mode for a colorblind user according to the embodiment of the disclosure, when the transparent hydrophobic layer matching the transparent polar liquid is applied, voltage can be changed to thereby control precisely the physical modality (a drop or film state) of the transparent polar liquid (doped with the band stop filter particles) so as to control the band stop filter particles to be enabled or disabled. When the transparent polar liquid appears in the drop state, the band stop filter particles are collected, and have no filter effect, so that there is a normal display mode suitable for a vision-healthy user; and when the transparent polar liquid appears in the film state, the band stop filter particles are tiled, and have an effect of band stop filtering, so that there is a display mode suitable for a colorblind patient. When the non-liquid transparent medium is the gas, etc., the band stop filter particles can be charged or magnetic, and driven by an electric or magnetic field to have their physical scattered state changed between the collected and scattered state, so that the display mode can be switched between the normal display mode suitable for a vision-healthy user, and the display mode suitable for a colorblind patient. Accordingly the display device according to the embodiment of the disclosure can be switched between the at least two display modes to thereby satisfy both a demand for a vision-disabled patient, and a demand of a vision-normal user.

Figure 4:
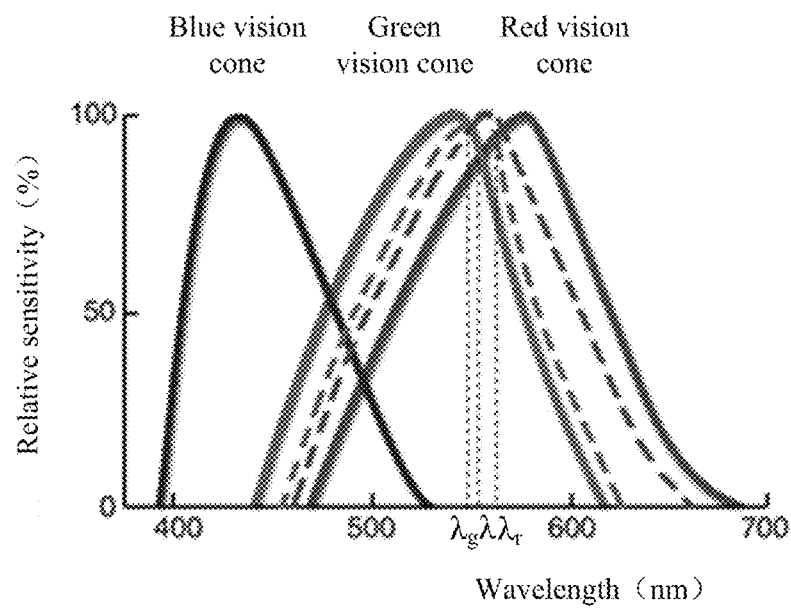
FIG. 4 is a schematic diagram of relative sensitivities of vision cones of a daltonian user to observed light at different wavelengths according to an embodiment of the disclosure.
Figure 5:
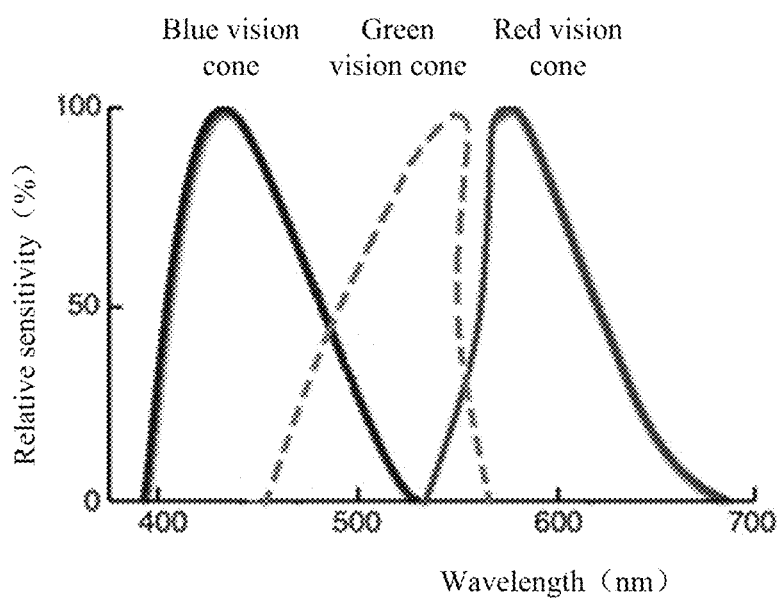
FIG. 5 is a schematic diagram of relative sensitivities of the vision cones of the daltonian user to the observed light at the different wavelengths after light exiting from a display panel is filtered by a filter layer in the display panel according to the embodiment of the disclosure.

Under an operating principle of the technical solution according to the embodiment of the disclosure, human vision cone cells are categorized into three types, i.e., long-wavelength, middle-wavelength, and short-wavelength types, corresponding respectively to the red (R) type, the green (G) type, and the blue (B) type. Each type of vision cone cells sense light in some range of wavelengths, and pass a sensed color to the brain. Vision cone cells of a vision-disabled patient typically function abnormally instead of sensing color information correctly. For example, ranges of wavelengths sensed by R-type and G-type vision cone cells in a daltonian vision-disabled patient overlap with each other, so that the red and green colors cannot be distinguished in effect from each other. The wavelengths in the overlapping section $[\lambda_g, \lambda_r]$ can be filtered out using a band stop filter substance (dichromate glutin) to modify the visual sensing functions of the daltonian vision-disabled patient for the red and green colors as illustrated in FIG. 4 and FIG. 5, where FIG. 4 illustrate relative sensitivities of vision cones of a daltonian user to light at different wavelengths, and since light in the range of wavelengths $[\lambda_g, \lambda_r]$ can be sensed by both red and green vision cones of the daltonian user, the red and green colors cannot be distinguished from each other; and FIG. 5 illustrates relative sensitivities of the vision cones of the daltonian user to the observed light at the different wavelengths after the light exiting the display module is filtered by the filter layer in the display panel according to the embodiment of the disclosure, and since light in the range of wavelengths $[\lambda_g, \lambda_r]$ can be filtered out, the daltonian user also can distinguish the red and green colors from each other.

Of course, the display device according to the embodiment of the disclosure can further include other conventional structural components necessary to the display device, the display panel, etc., although a repeated description thereof will be omitted here.

A detailed structure of a display panel according to an embodiment of the disclosure will be described below with reference to the drawings.

Figure 2:
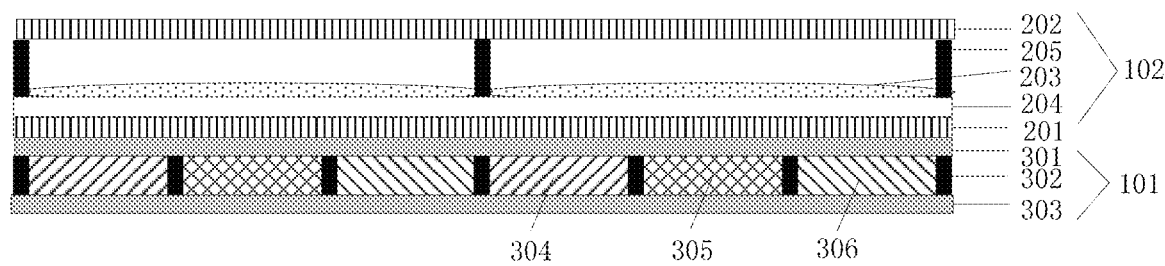
FIG. 2 is a detailed schematic structural diagram of the display panel according to the embodiment of the disclosure.

As illustrated in FIG. 2, a display panel according to an embodiment of the disclosure includes a display module 101, and a filter layer 102 arranged on a light exit side of the display module 101, where there are at least two display modes of the filter layer 102, and the at least two display modes includes a first display mode in which light emitted from the display module is filtered out, and a second display mode in which light emitted from the display module is not filtered out.

The filter layer 102 includes a first electrode 202, a second electrode 201, and transparent polar liquid 203, doped with band stop filter particles, located between the first electrode 202 and the second electrode 201.

The display module 101 includes an upper glass substrate 301, a lower glass substrate 302, a black matrix 302 located between the upper glass substrate 301 and the lower glass substrate 302, and sub-pixel elements spaced by the black matrix 302, e.g., red sub-pixels 304, green sub-pixels 305, and blue sub-pixels 306. Of course, the display module further includes other structures, although a repeated description thereof will be omitted here.

In the display panel according to the embodiment of the disclosure, voltage of the transparent first electrode 202 and second electrode 201 can be changed to thereby control precisely a physical characteristic of the transparent polar liquid 203 doped with the band stop filter particles so as to control the band stop filter particles to be enabled or disabled, so that the filter layer can be switched between the first display mode suitable for a vision-disabled user, and the second display mode suitable for a normal user.

Optionally the filter layer 102 further includes a transparent hydrophobic layer 204 arranged on the side of the second electrode 201 facing the first electrode 202, and the transparent polar liquid 203 with the band stop filter particles is located between the hydrophobic layer 204 and the first electrode 202.

In this structure, the voltage of the transparent first electrode 202 and second electrode 201 can be changed to thereby control precisely a physical modality of the transparent polar liquid 203 doped with the band stop filter particles, where the physical modality can be a drop or film state, so as to control the band stop filter particles to be enabled or disabled. When the transparent polar liquid 203 appears in the drop state, the band stop filter particles are collected, and have no filter effect, thus enabling the second display mode suitable for a normal user; and when the transparent polar liquid 203 appears in the film state, the band stop filter particles are tiled, and have a filter effect, thus enabling the first display mode suitable for a vision-disabled user.

Optionally when there is the hydrophobic layer, the filter layer 102 further includes a black matrix 205 arranged on the hydrophobic layer 204.

Optionally when there is no hydrophobic layer, the filter layer 102 further includes a black matrix arranged on the side of the second electrode facing the first electrode.

As can be apparent from FIG. 2, each red sub-pixel 304, each green sub-pixel 305, and each blue sub-pixel 306 constitute one of the pixel elements, and an orthographic projection of the black matrix 205 in the filter layer 102 overlaps with an orthographic projection of the black matrix 302 in the display module 101.

As can be readily appreciated, the display module can be a self-light-emitting display module, and for example, the display panel can be an OLED panel, a QLED panel, etc., and an array layer (i.e., the filter layer) consisted of a transparent medium layer doped with band stop filter particles can be added above a glass cover; or the display module can be a liquid crystal display module, and for example, the display panel can be an LCD panel, and an array layer consisted of a transparent medium layer doped with band stop filter particles can be added above a Color Filter (CF) substrate of a TFT-LCD.

In the display device according to the embodiment of the disclosure, the band stop filter particles are doped into the transparent polar liquid, and the voltage is controlled to thereby control the physical characteristic of the transparent polar liquid (doped with the band stop filter particles) so as to control the band stop filter particles to be enabled or disabled, so that the transparent polar liquid can be switched in the normal display mode (suitable for a vision-healthy user), and the display mode for a colorblind user (suitable for a colorblind patient).

An embodiment of the disclosure further provides a process of manufacturing a display panel, where the process includes following steps.

Forming a display module and forming a filter layer; where the filter layer is located on a light exit side of the display module; and the filter layer is configured to be switched between at least two display modes so that it does not filter out light emitted from the display module in one of the display mode, and filters out light emitted from the display module in a preset range of wavelengths in the other display mode.

Optionally the step of forming the filter layer optionally includes forming a first electrode and a second electrode; and filling a transparent medium between the first electrode and the second electrode; where the transparent medium is doped with band stop filter particles configured to filters out the light emitted from the display module in the preset range of wavelengths.

The display panel above can be a TFT-LCD, or can be an OLED, a QLED, etc.

The manufacturing process will be described below in details by way of an example in which a TFT-LCD is switched between a display mode for a protanopia user, and a normal display mode.

Figure 6:
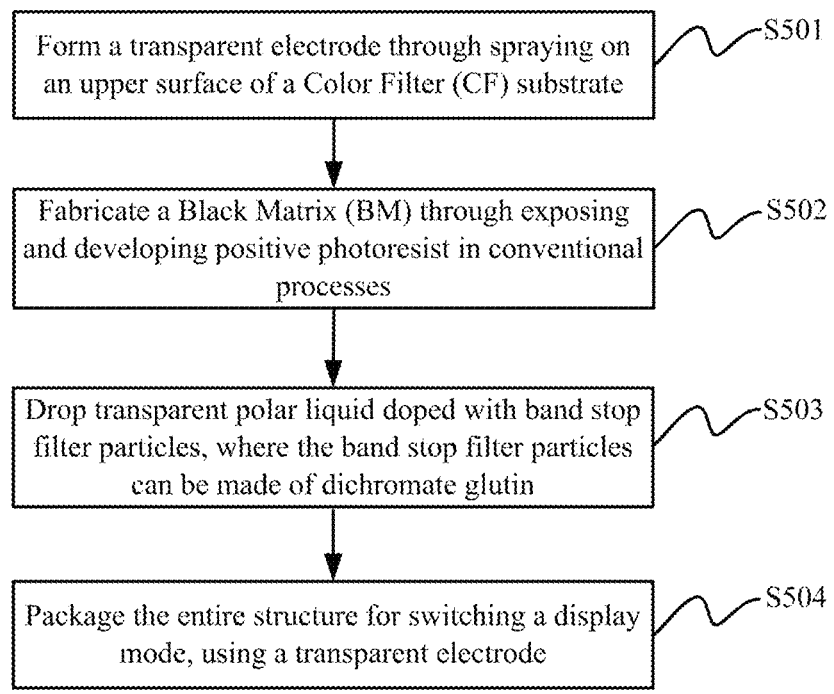
FIG. 6 is a schematic diagram of a process of manufacturing the display panel according to the embodiment of the disclosure.

Referring to FIG. 6, a process for manufacturing a TFT-LCD display panel according to an embodiment of the disclosure includes following steps.

Figure 3:
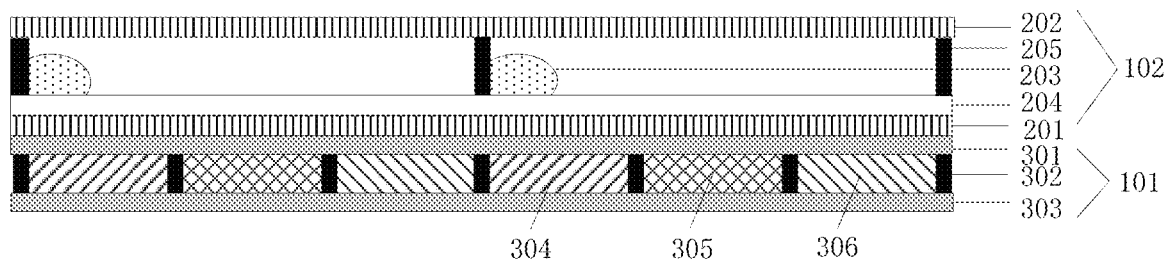
FIG. 3 is a detailed schematic structural diagram of the display panel according to the embodiment of the disclosure.

S501 is to form a transparent electrode through spraying on an upper surface of a Color Filter (CF) substrate. Referring to FIG. 3, the electrode 201 is formed on the glass substrate 301 in this step.

S502 is to fabricate a Black Matrix (BM) through exposing and developing positive photoresist in conventional processes. Referring to FIG. 3, the BM 205 is formed on the electrode 201 in this step.

It shall be noted that the hydrophobic layer 204 can be formed on the electrode 201 before the BM 205 is formed, so the BM 205 is formed on the hydrophobic layer 204.

S503 is to drop transparent polar liquid doped with band stop filter particles, where the band stop filter particles can be made of dichromate glutin. Referring to FIG. 3, the transparent polar liquid 203 is dropped among the BM 205 in this step.

S504 is to package the entire structure for switching a display mode, using a transparent electrode. Referring to FIG. 3, the electrode 202 is packaged on the entire outermost side of the product in this step.

By way of an example in which there are a display mode for a protanopia user, and a normal display mode, the display device manufactured according to the embodiment of the disclosure operates under such a principle that when voltage is not applied, the transparent polar liquid tiled on the surface of the transparent hydrophobic layer is converged into a drop state under the action of the hydrophobic layer of hydrophobic, and the band stop filter particles doped in the transparent polar liquid are collected as the transparent polar liquid is converged, so the band stop filter particles will not filter light transmitted through the display module, thus enabling the normal display mode suitable for a vision-normal user; and when voltage is applied, the transparent polar liquid in the drop state is spread on the surface of the hydrophobic material into a film state under the action of the voltage, and the band stop filter particles doped in the transparent polar liquid are tiled as the transparent polar liquid is tiled, so the band stop filter particles will filter light transmitted through the display module in some range of wavelengths, thus enabling the display mode for a vision-disabled user, which is suitable for a vision-disabled patient. In this way, the electric field between the transparent first electrode and second electrode can be controlled to be switched on and off to thereby switch the display panel between the display mode for a vision-disabled user, and the normal display mode.

A detailed principle of the process above is as follows.

In the display mode for a vision-disabled user: when the electric field is applied between the electrode 201 and the electrode 202, the transparent polar liquid (in the drop state) is spread on the surface of the hydrophobic material into the film state as illustrated in FIG. 2, where the band stop filter particles (dichromate glutin) doped in the transparent polar liquid are tiled as the transparent polar liquid is tiled, and can have a filter effect. Since ranges of wavelengths sensed by R-type and G-type vision cone cells in a daltonian vision-disabled patient overlap with each other, the red and green colors cannot be distinguished in effect from each other. At this time, light transmitted through the display module in the overlapping section of wavelengths $[\lambda_g, \lambda_r]$ can be filtered out using the tiled band stop filter particles to modify the visual sensing functions of the daltonian vision-disabled patient for the red and green colors, thus enabling the display mode for a colorblind user (suitable for a daltonian patient).

In the normal display mode: when the electric field is not applied between the electrode 201 and the electrode 202, the transparent polar liquid tiled on the surface of the transparent hydrophobic material is converged into the drop state as illustrated in FIG. 3, where the band stop filter particles doped in the transparent polar liquid are collected as the transparent polar liquid is converged, and will not filter light transmitted through the display module, thus enabling the normal display mode (suitable for a vision-health user).

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A display panel, comprising: a display module, and a filter layer located on a light exit side of the display module, wherein the filter layer comprises a transparent medium; wherein the transparent medium is doped with band stop filter particles configured to filter out a light emitted from the display module in a preset range of wavelengths;

wherein the filter layer comprises a first electrode, a second electrode, and the transparent medium is located between the first electrode and the second electrode; the filter layer is configured to be switched between at least two display modes under an action of an electric field and/or a magnetic field, so that it does not filter out light emitted from the display module in one of the display modes, and filters out light emitted from the display module in the preset range of wavelengths in other one of the display modes;

wherein the second electrode is arranged on the display module, and the filter layer further comprises a transparent hydrophobic layer arranged on a side of the second electrode facing the first electrode, and the transparent medium is located between the hydrophobic layer and the first electrode.

2. The display panel according to claim 1, wherein the transparent medium is transparent polar liquid.

3. The display panel according to claim 1, further comprises a black matrix arranged on the hydrophobic layer.

4. The display panel according to claim 3, wherein an orthographic projection of the black matrix onto the display module lies within, or overlaps with, an orthographic projection of a black matrix, in the display module, for defining pixel elements.

5. The display panel according to claim 3, wherein the first electrode is carried above the black matrix on the hydrophobic layer.

6. The display panel according to claim 1, wherein a material of the band stop filter particles comprises dichromate glutin.

7. The display panel according to claim 1, wherein the transparent medium is gas; the band stop filter particles are charged or magnetic.

8. The display panel according to claim 7, wherein the second electrode is arranged on the display module.

9. The display panel according to claim 8, further comprises a black matrix arranged on a side of the second electrode facing to the first electrode.

10. The display panel according to claim 8, wherein an orthographic projection of the black matrix onto the display module lies within, or overlaps with, an orthographic projection of a black matrix, in the display module, for defining pixel elements.

11. The display panel according to claim 10, wherein the first electrode is carried above the black matrix arranged on the side of the second electrode facing to the first electrode.

12. A display device, comprising the display panel according to claim 1.

13. The display device according to claim 12, wherein the filter layer comprises a first electrode, a second electrode, and the transparent medium is located between the first electrode and the second electrode; the transparent medium is transparent polar liquid; and the display device further comprises a control unit configured to control an electric field between the first electrode and the second electrode to be enabled and disabled, to thereby control the transparent polar liquid so that the band stop filter particles doped therein are in a converged and collected state, and a spread and tiled state.

14. The display device according to claim 13, wherein the second electrode is arranged on the display module, and the filter layer further comprises a transparent hydrophobic layer arranged on a side of the second electrode facing the first electrode, and the transparent medium is located between the hydrophobic layer and the first electrode.

15. The display device according to claim 14, wherein the filter layer further comprises a black matrix arranged on the hydrophobic layer; an orthographic projection of the black matrix onto the display module lies within, or overlaps with, an orthographic projection of a black matrix, in the display module, for defining pixel elements; the first electrode is carried above the black matrix on the hydrophobic layer; a material of the band stop filter particles comprises dichromate glutin.

16. The display device according to claim 12, wherein the transparent medium is gas; the band stop filter particles are charged or magnetic; the display device further comprises a control unit configured to control an electric field between the first electrode and the second electrode to be enabled and disabled, to thereby control the gas so that the band stop filter particles doped therein are in a converged and collected state, and a spread and tiled state.

17. The display device according to claim 16, wherein the second electrode is arranged on the display module; the filter layer further comprises a black matrix arranged on a side of the second electrode facing to the first electrode; an orthographic projection of the black matrix onto the display module lies within, or overlaps with, an orthographic projection of a black matrix, in the display module, for defining pixel elements; the first electrode is carried above the black matrix arranged on the side of the second electrode facing to the first electrode.

18. A method for manufacturing a display panel, comprises:

forming a display module;

forming a filter layer on a light exit side of the display module; wherein the filter layer comprises a transparent medium; the transparent medium is doped with band stop filter particles configured to filter out a light emitted from the display module in a preset range of wavelengths;

wherein the filter layer comprises a first electrode, a second electrode, and the transparent medium is located between the first electrode and the second electrode; the filter layer is configured to be switched between at least two display modes under an action of an electric field and/or a magnetic field, so that it does not filter out light emitted from the display module in one of the display modes, and filters out light emitted from the display module in the preset range of wavelengths in other one of the display modes;

wherein the second electrode is arranged on the display module, and the filter layer further comprises a transparent hydrophobic layer arranged on a side of the second electrode facing the first electrode, and the transparent medium is located between the hydrophobic layer and the first electrode.

\* \* \* \* \*